Oct. 9, 1973   H. A. KMIECIAK ET AL   3,764,279

PROTECTIVE ALLOY COATING AND METHOD

Filed Jan. 11, 1971

INVENTORS
Henry A. Kmieciak
John D. Gadd

BY Hill, Sherman, Meroni, Gross & Simpson   ATTORNEYS

# United States Patent Office 3,764,279
Patented Oct. 9, 1973

3,764,279
PROTECTIVE ALLOY COATING AND METHOD
Henry A. Kmieciak, Chesterland, Ohio, and John D. Gadd, Hummelstown, Pa., assignors to TRW Inc., Cleveland, Ohio
Filed Jan. 11, 1971, Ser. No. 105,183
Int. Cl. B32b *15/20*
U.S. Cl. 29—194         3 Claims

ABSTRACT OF THE DISCLOSURE

The present invention relates to a superalloy material particularly resistant to corrosive sulfidation attack comprising a base nickel or cobalt superalloy having coated thereon a manganese modified aluminide coating. The invention also includes the method of making the above superalloy material by first providing as a base metal a nickel or cobalt superalloy, pre-coating said alloy with manganese to alloy-bond said manganese with said base superalloy, and finally coating said pre-coated superalloy with aluminum to form an overlying manganese modified aluminide coating.

BACKGROUND OF THE INVENTION

Field of the invention

The present invention relates to superalloy materials, particularly resistant to corrosive sulfidation attack and their method of preparation. These corrosion resistant materials are especially useful in turbo superchargers, gas turbines, jet aircraft engines and the like which are particularly susceptible to hot corrosive influences and more particularly to sulfur corrosion.

Prior art

Many high temperature applications which involve turbo superchargers, gas turbines, jet aircraft engines and the like require materials having the ability to operate under extreme conditions of temperature and, as well, quite often under a corrosive environment. For such applications the ability of the alloy to resist corrosion at extremely high temperature is critical, and frequently spells the difference between acceptability and non-acceptability of a particular alloy regardless of its other physical properties.

For example, in an aircraft gas turbine material there has been a continual demand for better high temperature mechanical properties. This led to a reduction in the alloy chromium content from about 20% to about 10%. However, this alloy composition adjustment has resulted in increased susceptibility of turbine hardware to high temperature corrosion. This problem is particularly prevalent when sulfur and/or salt is present in the environment as promoted by engine fuel sulfur content and ingested salt laden air.

The hot sulfur corrosion or sulfidation problem has been minimized by using diffused aluminum coatings or multiple-constituent coatings based on aluminum. These coatings have been successful in resisting the hot corrosion environment even at the most severe corrosive service temperatures of 1500–1800° F.

However, with the trend toward even higher turbine inlet temperatures, it has become apparent that the present aluminide coatings are not entirely adequate for protecting turbine components in hot corrosive environments. It would therefore be a considerable advance in the art if an improved aluminide coating system were discovered which showed materially advanced resistance to hot corrosive sulfidation attack compared to current coatings of this type. If a superalloy material were discovered which showed greatly enhanced resistance to sulfur-salt corrosion at extremely high temperatures, such material would find ready acceptance in the art, particularly when used in aircraft gas turbines and the like.

SUMMARY OF THE INVENTION

The present invention solves the just-discussed hot corrosion problem by providing a new and improved superalloy material. This material which is particularly resistant to corrosive sulfidation attack broadly comprises a base nickel or cobalt superalloy having coated thereon a manganese modified aluminide coating. The superalloy material is made by first providing a nickel or cobalt superalloy, precoating said base material with manganese to alloy-bond said manganese to said base superalloy, and finally again coating said pre-coated superalloy with aluminum to form an overlying manganese modified aluminide coating.

In view of the above it therefore becomes an object of the invention to provide a new superalloy material highly resistant to corrosive sulfidation attack.

Another object of the invention is to provide a method of making the above described superalloy.

Still another object of the invention is to provide a superalloy material highly resistant to hot corrosive attack which is particularly useful as a material utilized in making an aircraft gas turbine.

A further object of the invention is to provide a method of increasing resistance to corrosion of superalloy aluminide-coated materials under high temperature conditions.

Yet another object of the invention is to provide a method of making a highly corrosion resistant material, which material can be made by utilizing known coating techniques without resorting to highly sophisticated and costly apparatuses and/or unduly multiplied process steps.

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which:

DESCRIPTION OF THE PREFERRED EMBODIMENT

Figure 1:
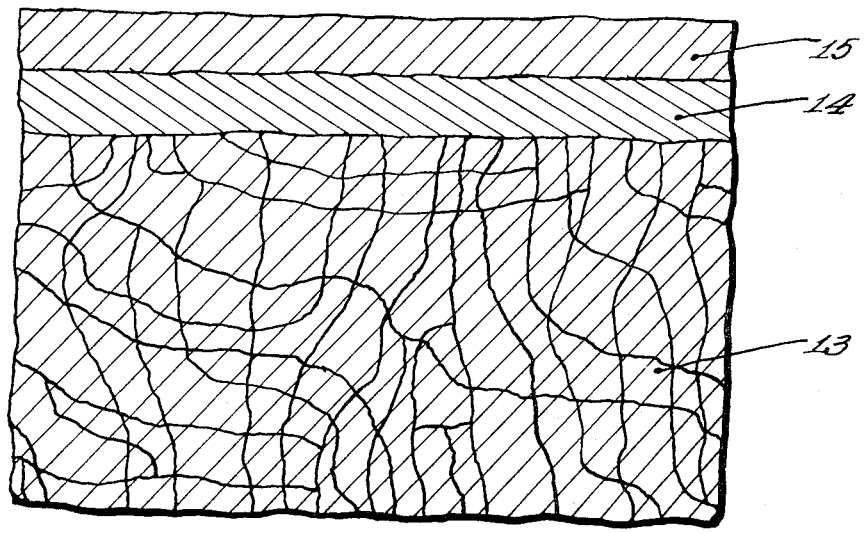
FIG. 1 is a fragmentary, cross-sectional view, greatly enlarged, of a coated superalloy article of the invention.

As briefly outlined above, the hot corrosion of a variety of materials, and particularly gas turbine parts is becoming an important limitation on their life at maximum operating temperature. This corrosion problem is accentuated when the parts are air cooled and/or when the turbine is operated in a marine environment. In air cooling, the bulk of the air foil is effectively cooled to provide the necessary creep strength. As a consequence, the service can be operated at a higher temperature, which however leads to increased susceptibility to corrosion. This corrosion problem is most severe at the leading and trailing edges, where the cooling is not as effective.

When gas turbines are operated near bodies of salt water, small amounts of sea salt are ingested along with the air. As a result, sodium sulfate, either obtained directly from the sea water or produced by reacting sodium chloride from the sea water, and sulfur from the fuel is condensed on gas turbine parts and results in rapid degradation thereof.

Because of these and other corrosion problems, the use of protective coatings is progressively increasing. As noted above, under the more severe conditions anticipated in advanced air cooled engines and those encountered in marine environments, resort solely to aluminide coatings has been found not to be satisfactory. Therefore, in accordance with the instant invention improved coated superalloys were sought. The specifically defined coated superalloy found here has greatly enhanced hot corrosion resistance, particularly against the extremely corrosive environment of salt and sulfur bodies.

In order to prepare the coated superalloys of the invention the first step, of course, is to provide a suitable base superalloy. These superalloys may be either nickel or cobalt superalloys. In addition to nickel or cobalt or both in the alloy, these alloys may contain a wide variety of other metals including chromium, tungsten, aluminum, titanium, columbium, carbon, boron, zirconium, iron, hafnium, manganase, etc.

A typical nickel superalloy with a broad range of alloying components is given below.

TABLE I

| Component: | Percent by weight |
|---|---|
| Chromium | 9–13 |
| Cobalt | 5–15 |
| Tungsten | 7–12 |
| Aluminum | 5.5–7 |
| Titanium | 0.5–2.0 |
| Columbium | Up to 2 |
| Carbon | 0.05–0.25 |
| Boron | 0.01–0.08 |
| Zirconium | 0.01–0.20 |

Nickel, substantially the balance.

Within the above broader range, the best alloys which have been produced have analysis within the following narrower ranges:

TABLE II

| Component: | Percent by weight |
|---|---|
| Chromium | 9.5–11.0 |
| Cobalt | 9.0–11.0 |
| Tungsten | 8.5–9.5 |
| Aluminum | 6.0–6.8 |
| Titanium | 0.75–1.25 |
| Columbium | 1.2–1.8 |
| Carbon | 0.085–0.14 |
| Boron | 0.02–0.04 |
| Zirconium | 0.07–0.13 |

Nickel, substantially the balance.

A typical specific alloy is given below:

TABLE III

| Component: | Percent by weight |
|---|---|
| Chromium | 10.3 |
| Cobalt | 10.0 |
| Tungsten | 9.0 |
| Aluminum | 6.3 |
| Titanium | 1.0 |
| Columbium | 1.5 |
| Carbon | 0.11 |
| Boron | 0.03 |
| Zirconium | 0.10 |

Nickel, substantially the balance.

The next step in the process of the invention involves precoating the nickel or cobalt superalloy with manganese. As will be shown below, manganese was surprisingly effective in rendering the final material more resistant to severe corrosion as compared to a number of other precoating materials tested in a similar manner.

The manganese may be precoated upon the superalloy as a 100% pure powder, as a powder in combination with a variety of other alloying materials such as those enumerated above in conjunction with the base superalloys, or in prealloy form with the one or more of the above additional components or others.

Probably the best technique now available in order to coat the manganese or manganese alloy upon the base metal involves what is known as a vacuum pack technique. Here the manganese is heated in a vacuum chamber to a temperature sufficient to vaporize the pure manganese or alloy powders or mixtures thereof in a container. This produces a solid-vapor interface diffusion alloying reaction with the base metal to form a surface manganese alloy between the manganese coating and base material and thus prevents diffusion of the outer surface layer of the pure manganese or alloy.

Since a solid-vapor interface reaction occurs between the solid base metal or alloy in the vapor state coating of manganese metal or alloy the diffusion of the vapor into the base metal is in direct proportion to the surface area of the coating manganese particles or powders employed, or in inverse proportion to the granular size of the particles. Thus, the concentration of the manganese coating metal vapor atmosphere of the container is a function of the relative proportion of coating manganese metal granules or relative proportion of the mixture of coating metal granules, coating alloy granules or coating alloy mixture of granules, the particle size of each type of manganese metal or manganese alloy granule, and the temperature employed which determines the equilibrium vapor pressure in the container. The larger the particle size of the coating metal or alloy, the smaller the surface area thereof, and correspondingly the lower the actual vapor pressure of that metal in the container, due to the lower rate of approach to the equilibrium vapor pressure. When employing a mixture of manganese and other coating metals, the coating metal powder is preferably of a mesh particle size between —10 and —200 mesh, depending, of course, upon the metals or alloys employed.

The base nickel or cobalt alloy to be coated are packed in the desired manganese coating metal or alloy or metal mixtures thereof, which are to produce a metallic vapor or vapor atmosphere. The container is fitted with a loosely fitted cap and placed in a vacuum chamber. Next the vacuum chamber is evacuated, preferably to 0.1 micron or less. The vapor chamber is then heated to a temperature sufficient to vaporize the pack media.

The coating element atmosphere within the container is the vaporous manganese metal or alloy and is uncontaminated by other gases or by water vapor, when equilibrium vapor pressure conditions are established in the container. The base nickel or cobalt superalloy therefore undergoes a solid-vapor interface reaction with the vaporous manganese coating which diffuses into the base metal.

The composition and the depth of the resulting alloy-coated diffusion layer is a function of the composition of the manganese coating vapor atmosphere, the relative diffusion rates of the manganese coating metal or alloy or mixtures thereof in the base metal, if manganese is employed with other materials, and the time of diffusion at the established temperature. After the desired depth of diffusion has been obtained, the temperature of the chamber is reduced, and upon cooling, the vapors of manganese form a firmly bonded surface layer of a manganese-rich alloy coating on the diffusion layer.

The last step of the invention involves finally coating the pre-coated base superalloy with aluminum. Again, the aluminum coating may be deposited using a pure aluminum powder, a powder mixture of aluminum and one or more additional metals, or a pre-alloyed aluminum. The aluminum may be utilized in conjunction with any one or more of the above enumerated metals which may comprise a portion of the base nickel or cobalt superalloy. One specific aluminum mixture includes aluminum and chromium in various proportions. Again, the best method of depositing the final aluminide coating involves resorting to the above-described vacuum packed technique. The final aluminide coating becomes alloy bonded with the manganese coating to form a manganese modified aluminide top layer. This top alloy coating, of course, is rich in aluminum.

The final coated articles of the invention are best described by reference to the drawings. In FIG. 1 there is shown a nickel or cobalt base superalloy 13, a second or pre-coat of manganese 14 and a final aluminide coating 15.

Figure 2:
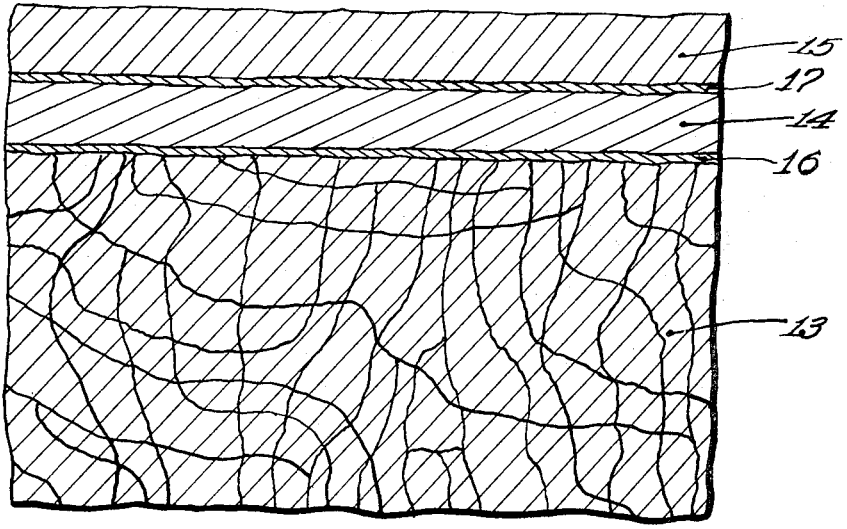
FIG. 2 is a view similar to FIG. 1, illustrating the corrosion resistant coatings of the invention in more detail.

The superalloy articles of the invention are more fully shown in FIG. 2 which also shows the diffusion layers. Again, there is shown a base superalloy 13 overlying which is a diffusion zone 16 between the manganese-rich coating 14 and the base superalloy. Also shown is a second diffusion layer 17 lying between the manganese coat 14 and the aluminide top layer 15.

The following example illustrates preparation of a typical coated superalloy of the invention. All parts and percentages are in terms of weight unless otherwise expressed.

EXAMPLE I

A nickel based superalloy similar to the superalloy composition of Table III was cast both into a standard wedge-shaped erosion bar and a 0.5 inch diameter cylinder. A wafer 0.1 inch thick was machined from the cylinder and both specimen configurations were coated first with manganese using a vacuum pack technique. The manganese, since it has a high vapor pressure was deposited without any activator and with continuous evacuation at 1600° F. The manganese was applied at two levels of 13 and 23 mg./cm.$^2$. These runs lasted for 6 and 12 hours respectively.

After prealloying the surface of the erosion bar and metallographic wafer with manganese, an aluminide coating was formed again using a vacuum pack cycle technique. Specifically, the aluminide coating was formed by the above-described vacuum packed process and involved the use of a 56 weight percent chromium-44 weight percent aluminum pack media. The pack contained a chromium chloride which reacted predominantly with the aluminum species in the Cr-Al alloy at the process coating temperature. The temperature factor, in addition to other thermodynamic considerations favored the deposition and diffusion growth of an aluminum rich phase on the superalloy surface. On a percentage basis, chromium was deposited on approximately a $\frac{1}{20}$ ratio with the aluminum.

During the pack aluminizing, some manganese was lost to the pack because of the high vapor pressure of manganese. This was evident from the net weight gain during aluminizing of only 1.65 mg./cm.$^2$ on the heavy manganese pre-coat. The manganese pre-coat processing resulted in a diffusion of manganese for 4.0 to 5.0 mils and contained an interdiffusion zone about 1.0 mil thick. After aluminizing, the lightly pre-coated specimen had a 4.0 mil coating layer and the heavily pre-coated specimen evidenced a 5.5 mil coating. Both coatings had a thick diffusion zone (1.0 to 1.5 mils) and the thicker coating had a rough porous surface layer. Microprobe analysis of the thinner coating showed that there was manganese penetration to a depth of 4.0 mils, but aluminum penetration for only 3.0 mils.

In order to determine the efficacy of the invention the coated superalloy described above was subjected to a hot corrosion test. Specifically, the erosion bar was subjected to the test described below, while the wafer had been sectioned for metallographic and microprobe analysis of the applied coating as described above.

The particular test rig involved was a combustion chamber which burned Jet A turbine fuel and air to produce a simulated gas turbine combustion environment. The gas velocity exiting from the burner was approximately 700 feet/sec. Synthetic sea salt solution was aspirated into the exhaust gas to produce a combustion environment analogous to that experienced by a gas turbine engine operating in a coastal or sea area. The hot corrosion experienced by superalloys in an environment of this type is generally termed "sulfidation." Coated test bars were exposed in this exhaust gas for periods up to several hundred hours to evaluate their resistance to hot corrosion.

In order to compare the efficiency of the manganese pre-coat in resisting corrosion, a number of other metals were also utilized as a pre-coat media. These metals were also deposited using the vacuum pack technique to diffuse these modifying elements into the substrate or superalloy base.

Specifically, cobalt in one run was deposited as a precoating material using a pack consisting of 50% cobalt powder and 50% alumina powder. This was mixed with 2% ammonium chloride activator, the retort was evacuated, backfilled with argon to a pressure of 150 mm. of mercury and heated to 1900° F. One sample was heated 24 hours and the other 48 hours, giving both a thin and thick coated sample.

In another run, iron was deposited at 1900° F. in a similar manner using a 50% iron-50% alumina powder pack, 2% sodium fluoride activator, and argon at a pressure of 150 mm. of mercury. The specimens were treated for 12 and 24 hours respectively.

Further, hafnium was diffused into a nickel substrate using a pure hafnium powder pack, 5% sodium fluoride activator, argon at 150 mm. of mercury pressure, and a six hour cycle at 2000° F.

In a still further experiment, chromium deposition was achieved using a pure chromium pack with 2% chromium chloride activator, argon at a pressure of 150 mm. of mercury and a temperature of 1900° F. Three samples were taken after 12, 24 and 48 hours.

In the last run, zirconium was deposited using a zirconium-chromium powder pack. The powder was produced by induction melting of zirconium and chromium in an alumina crucible and pulverizing the very brittle ingot. The pack was mixed with 2% sodium fluoride, and heated to 1800° F. for 16 hours.

Results of the above-described testing are given in Table IV below.

TABLE IV

| Pre-coat element | Weight change during— | | Erosion life (hr.) |
|---|---|---|---|
| | Alloying (mg./cm.) | Aluminizing (mg./cm.) | |
| Cobalt | 6.85 | 9.15 | |
| | 13.5 | 10.4 | 20 |
| Chromium | 6.85 | 10.0 | 50 |
| | 9.7 | 8.0 | 60–70 |
| | 17.6 | 6.2 | 50 |
| Iron | 29.0 | 17.4 | 30 |
| | 33.0 | 16.0 | |
| Hafnium | 41.7 | [1] −12.0 | 10–20 |
| Zirconium | 9.4 | 8.7 | 20 |
| Manganese | 13.0 | 9.0 | 113+ |
| | 23.0 | [1] 1.65 | 60 |

[1] Some substrate material lost upon aluminizing.

As is readily seen, the resort to use of manganese precoat surprisingly greatly enhanced corrosion life under these very severe conditions. It should be noted here that the manganese precoat materially advanced the erosion life over a similar sample of the same base superalloy coated only with an aluminide coating. It is also clearly evident that the manganese pre-coat in comparison to other pre-coating elements gave surprising and unexpected corrosion resistance to the thus treated base superalloys. It was fully expected that many of these elements that were chosen would materially enhance corrosion existence. For example, chromium was selected because of its known beneficial effect on the sulfidation resistance of nickel base alloys. Cobalt was chosen because it is known that such base alloys are generally more resistant to sulfidation than nickel base alloys. Again, iron was chosen as a pre-coat because of the demonstrated corrosion resistance of a number of iron-base alloys. Zirconium and hafnium were chosen because they form high temperature compounds with aluminum and like aluminum form stable oxides.

With regard to each separate element the cobalt modification of the superalloy prior to aluminizing did not improve the sulfidation resistance compared to a like sample only involving an aluminide coating. Chromium was of some use in increasing erosion life of an aluminide coated base superalloy but, as is clearly evident, in no way can be compared to the utility of manganese. The addition of iron actually increased the diffusion of aluminum into the substrate and decreased sulfidation resistance. Zirconium and hafnium were detrimental additions to an aluminide coating.

While it is not completely understood how the manganese pre-coat aids in resisting hot corrosion attack, particularly sulfidation attack, it is believed that the following occurs. The formation of a protective aluminum oxide film on the aluminide surface is known to be the principal mode of protection afforded by the coating. Spalling of the aluminum oxide film, and dissolution of the oxide in liquid corrosion products such as sodium-aluminum-sulfate or other compounds causes the external depletion of aluminum, while internal diffusion removes aluminum from the surface compound. These mechanisms cause "wear out" of the aluminide coating. It is believed that the manganese in the aluminide reacts with sulfur atoms to produce high melting point corrosion products which will not affect fluxing and removal of the protective oxide film.

We claim as our invention:

1. A superalloy composite which is resistant to sulfidation attack comprising a base of a nickel or cobalt superalloy, a first coating consisting essentially of manganese overlying said base, a first diffusion zone uniting said base with said first coating, a second coating consisting predominantly of aluminum over said first coating and a second diffusion zone uniting said first coating with said second coating.

2. The composite of claim 1 in which said second coating also contains chromium.

3. The composite of claim 1 in which said second coating has manganese diffused therein from said first coating.

References Cited
UNITED STATES PATENTS

| | | | |
|---|---|---|---|
| 3,577,268 | 5/1971 | Whitfield et al. | 29—197 X |
| 3,594,219 | 7/1971 | Maxwell et al. | 29—197 X |
| 3,595,712 | 7/1971 | Boone et al. | 29—197 X |
| 3,649,226 | 3/1972 | Lynch et al. | 29—197 |

L. DEWAYNE RUTLEDGE, Primary Examiner

E. L. WEISE, Assistant Examiner

U.S. Cl. X.R.

29—197, 198; 117—71 M